(12) United States Patent
Hall (10) Patent No.: US 8,762,430 B1
(45) Date of Patent: Jun. 24, 2014

(54) KEY SUBSCRIPTION FOR DISTRIBUTED SYSTEMS

(75) Inventor: Ben Hall, Fairfield, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/588,904

(22) Filed: Aug. 17, 2012

Related U.S. Application Data (60) Provisional application No. 61/524,994, filed on Aug. 18, 2011.

(51) Int. Cl.
*G06F 17/30* (2006.01)
(52) U.S. Cl.
USPC .......................................................... 707/812
(58) Field of Classification Search
USPC .................. 707/2, 3, 812; 709/245; 463/43
See application file for complete search history.

(56) References Cited

U.S. PATENT DOCUMENTS 7,814,229 B1 * 10/2010 Cabrera et al. ................ 709/245
2010/0248843 A1 * 9/2010 Karsten ........................... 463/43

* cited by examiner

*Primary Examiner* — Etienne Leroux
(74) *Attorney, Agent, or Firm* — Schwegman Lundberg & Woessner, P.A.

(57) ABSTRACT

A system and method for a distributed data system is described. A distributed data system client communicates with a distributed data storage server. The distributed data system client subscribes to a data key stored in a storage device of the distributed data storage server, and receives changes to the data key. The name of the data key is translated to retrieve a corresponding storage location. Changes to the data key are stored in the corresponding storage location.

20 Claims, 8 Drawing Sheets

KEY SUBSCRIPTION FOR DISTRIBUTED SYSTEMS

RELATED APPLICATION

The present application claims priority to U.S. Provisional Patent Application Ser. No. 61/524,994 filed Aug. 18, 2011, which is incorporated herein by reference in its entirety for all purposes.

BACKGROUND

1. Technical Field

The present disclosure generally relates to distributed systems and, in particular embodiments, to a key subscription system.

Clients accessing distributed system need to have the latest version of any changes to files stored in the distributed system. As such, a system with a large number of clients and distributed system may require a lot of time for clients to update to the latest changes in any files stored in the distributed system.

BRIEF DESCRIPTION OF THE DRAWINGS

The present disclosure is illustrated by way of example, and not by way of limitation, in the figures of the accompanying drawings in which.

DETAILED DESCRIPTION

Although the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

A system and method for a distributed data system is described. A distributed data system client communicates with a distributed data storage server. The distributed data system client subscribes to a data key stored in a storage device of the distributed data storage server, and receives changes to the data key. The name of the data key is translated to retrieve a corresponding storage location. Changes to the data key are stored in the corresponding storage location.

Online Game Networking System

Figure 1:
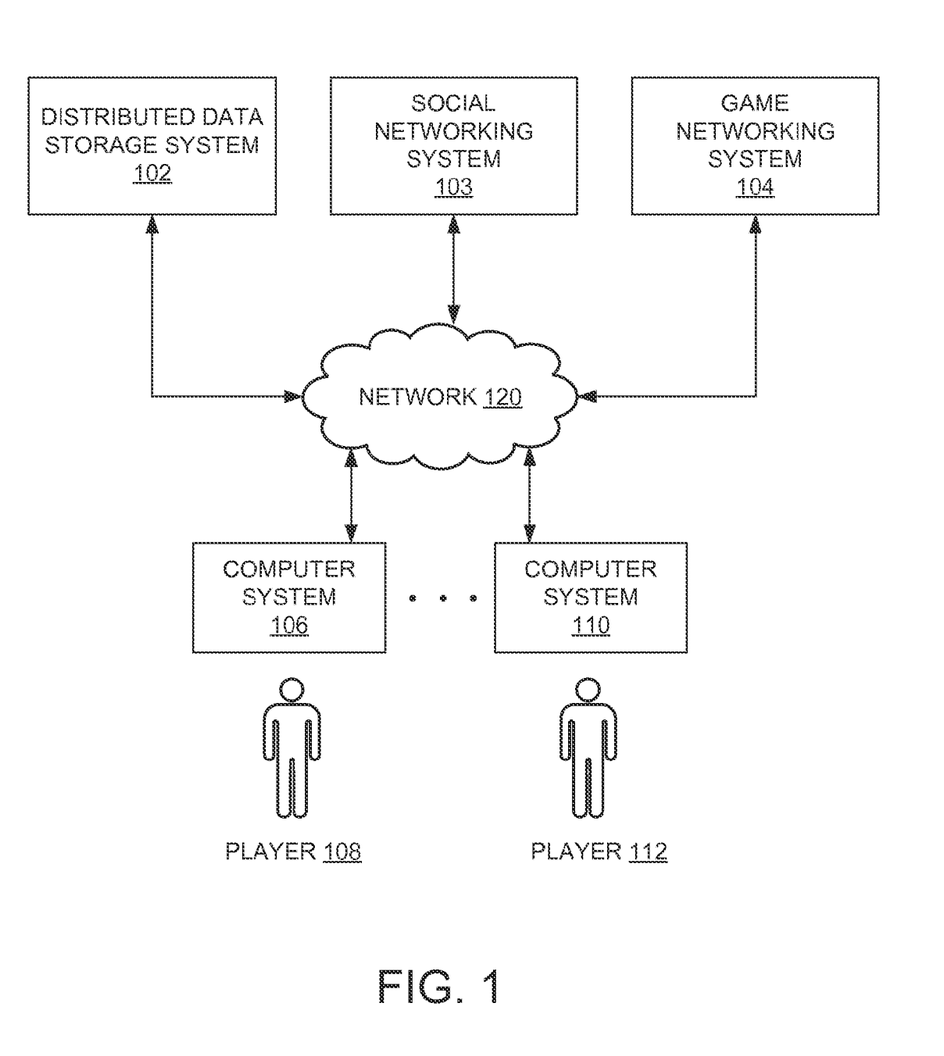
FIG. 1 is a block diagram illustrating an example of a system for implementing particular disclosed embodiments.

FIG. 1 is a block diagram illustrating network system 100, according to some embodiments. The network system 100 includes a network 120. The network 120 can generally include any type of wired or wireless communication channel capable of coupling together computing nodes (e.g., computer systems 106, 108). This includes, but is not limited to, a local area network (LAN), a wide area network (WAN), a portion of the Public Switched Telephone Network (PSTN), a cellular telephone network, another type of network, or a combination of networks. In some embodiments, the network 120 includes the Internet.

A distributed data storage system 102, a social networking system 103, a game networking system 104, and computer systems 106 and 110 are coupled to the network 120 and may communicate with each over via network 120.

In some embodiments, a player 108 plays an online game from his/her respective computer system 106. The online game may be hosted on a server of the game networking system 104. The player status or transactions in the online game are stored in configuration files. These configurations files may be stored in the distributed data storage system 102.

In one embodiment, the distributed data storage system 102 comprises a set of distributed applications coordinated by a service provider also referred to as "ZooKeeper." Distributed collaborative applications involve a set of processes or agents interacting with one another to accomplish a common goal. They execute on Wide Area environments with little or no knowledge of the infrastructure and almost no control over the resources available. Besides, they need to sequence and order events, and ensure atomicity of actions. Above all, the application needs to keep itself from deadlocks and partial failures.

Zookeeper provides a centralized configuration service and naming registry for large distributed systems. ZooKeeper's architecture supports high-availability through redundant services. The clients can thus ask another ZooKeeper master if the first fails to answer. ZooKeeper nodes store its data in a hierarchical name space, much like a file system or a tree datastructure. Clients can read and write from/to the nodes and in this way have a shared configuration service.

In one embodiment, ZooKeeper maintains a shared hierarchical namespace modeled after standard file systems. The namespace consists of data registers, called znodes which are similar to files and directories. Znodes store data in memory primarily resulting in high throughput and low latency.

Znodes are identified by unique absolute paths which are "/" delimited Unicode strings. To help achieve uniqueness, ZooKeeper provides sequential znodes where a globally maintained sequence number will be appended by ZooKeeper to paths.

Each Znode includes a key and a value. The key is a sequence of path elements including a key. The distributed data storage system 102 generates/creates keys and stores them on a server of the distributed data storage system 102.

Although only one instance of the distributed data storage system 102, the game networking system 104, the social networking system 103 is illustrated in FIG. 1, each of the distributed data storage system 102, the social networking system 103, the game networking system 104 may include more than one computer system. For example, the distributed data storage system 102 may include a plurality of distributed computer systems (e.g., a plurality of computer systems distributed within a data center, a plurality of computer systems distributed across multiple geographic locations) that provide load balancing and/or low-latency access points at various geographic locations.

The game networking system 104 may include a game server that host one or more computer games for a game publisher. Although FIG. 1 illustrates a single instance of the game networking system 104, the network system 100 may include a game server for each of a plurality of game publishers. Furthermore, each game publisher may operate a plurality of distributed game servers (e.g., a plurality of game servers distributed within a data center, a plurality of game servers distributed across multiple geographic locations) that provide load balancing and/or low-latency access points at various geographic locations.

The computer system 106 may be a computer system for a player 108 of a game hosted by the game networking system 104. In some embodiments, the game is a network-based game. For example, the network-based game may be a game that is played on a social networking website. The computer system 106 may include a laptop computer system, a desktop computer system, a mobile phone, a smart phone, a personal digital assistant (PDA), a gaming console, a set top box, and the like. A player 108 may use the computer system 106 to play a game hosted by the game networking system 104. As illustrated in FIG. 1, the network system 100 may include a plurality of computer systems (e.g., a computer system 110) for a plurality of players (e.g., a player 112) of the game hosted by the game server of the game networking system 104.

The social networking system 103 may be a network-addressable computing system that can host one or more social graphs. The social networking system 103 can generate, store, receive, and transmit social networking data. The social network system 103 can be accessed by the other components of system 100 either directly or via network 130.

In an online game, a game engine manages the game state of the game. Game state comprises all game play parameters, including player character state, non-player character (NPC) state, in-game object state, game world state (e.g., internal game clocks, game environment), and other game play parameters. Each player 108 controls one or more player characters (PCs). The game engine controls all other aspects of the game, including non-player characters (NPCs), and in-game objects. The game engine also manages game state, including player character state for currently active (online) and inactive (offline) players.

The online game can be hosted by the game networking system 104, which can be accessed using any suitable connection with a suitable client (e.g, computer system 106). The player 108 may have a game account on the game networking system 104, wherein the game account can contain a variety of information associated with the player (e.g., the player's personal information, financial information, purchase history, player character state, game state). In some embodiments, the player 108 may play multiple games on the game networking system 104, which may maintain a single game account for the player 108 with respect to all the games, or multiple individual game accounts for each game with respect to the player 108. In some embodiments, the game networking system 104 can assign a unique identifier to each player 108 of an online game hosted on game networking system 104. Game networking system 104 can determine that the player 108 is accessing the online game by reading the user's cookies, which may be appended to HTTP requests transmitted by client system 130, and/or by the player 108 logging onto the online game.

In particular embodiments, the player 108 may access an online game and control the game's progress via computer system 106 (e.g., by inputting commands to the game at a client device). Computer system 106 can display the game interface, receive inputs from player 108, transmitting user inputs or other events to the game engine, and receive instructions from the game engine. The game engine can be executed on any suitable system (such as, for example, the computer system 106, the social networking system 103, or the game networking system 104). As an example and not by way of limitation, the computer system 106 can download client components of an online game, which are executed locally, while a remote game server, such as the game networking system 104, provides backend support for the client components and may be responsible for maintaining application data of the game, processing the inputs from the player, updating and/or synchronizing the game state based on the game logic and each input from the player, and transmitting instructions to computer system 106. As another example and not by way of limitation, each time the player 108 provides an input to the game through the computer system 106 (such as, for example, by typing on the keyboard or clicking the mouse of computer system 106), the client components of the game may transmit the player's input to the game networking system 104.

Game Systems, Social Networks, and Social Graphs

In an online multiplayer game, players may control player characters (PCs), while a game engine controls non-player characters (NPCs) and game features and also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game, In other implementations, no avatar or other graphical representation of the player character is displayed. Game state encompasses the notion of player character state and refers to any parameter value that characterizes the state of an in-game element, such as a non-player character, a virtual object (such as a wall or castle), and the like. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 108 may access particular game instances of an online game. A game instance is copy of a specific game play area that is created during runtime. In particular embodiments, a game instance is a discrete game play area where one or more players 108 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 108 and one or more in-game objects controlled by the game engine. When accessing an online game, the game engine may allow player 108 to select a particular game instance to play from a plurality of game instances. Alternatively, the game engine may automatically select the game instance that player 108 will access. In particular embodiments, an online game comprises only one game instance that all players 108 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. in particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. in particular embodiments, a unique client identifier can be assigned to each user in the social graph. This disclosure assumes that at least one entity of a social graph is a player or player character in an online multiplayer game.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N-1 other users), they are deemed to he separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, social networking system 103 or game networking system 104). In one embodiment, Nmax equals 1, such that the player's social network includes only first-degree friends. In another embodiment, Nmax is unlimited and the player's social'network is coextensive with the social graph.

In particular embodiments, the social graph is managed by game networking system 104, which is managed by the game operator. In other embodiments, the social graph is part of a social networking system 103 managed by a third-party (e.g., Facebook, Myspace). In yet other embodiments, player 108 has asocial network on both game networking system 104 and social networking system 103, wherein player 108 can have a social network on the game networking system 104 that is a subset, superset, or independent of the player's social network on social networking system 103. In such combined systems, game network system 104 can maintain social graph information with edge type attributes that indicate whether a given friend is an "in-game friend," an "out-of-game friend," or both. The various embodiments disclosed herein are operable when the social graph is managed by social networking system 103, game networking system 104, or both.

Figure 2A:
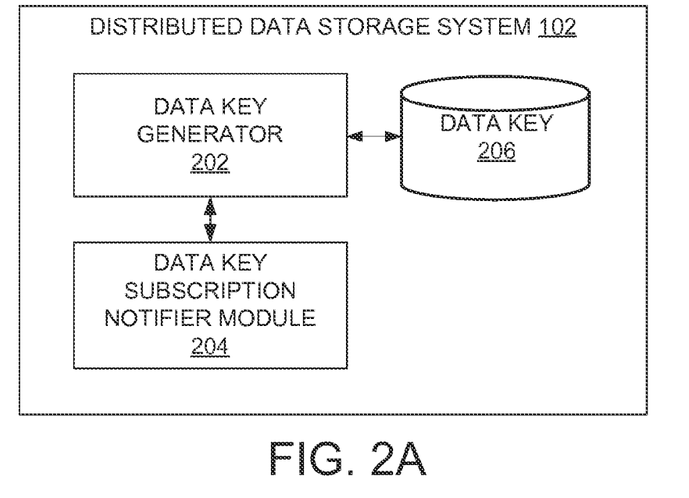
FIG. 2A is a block diagram illustrating an example of a data storage distributed system.

FIG. 2A is a block diagram illustrating an example of a data storage distributed system. The data storage distributed system 102 comprises a data key generator 202, a data key database 206, and a data key subscription notifier module 204.

The data key generator 202 generates a data key.

The data key database 206 stores the data key.

The data key subscription notifier module 204 subscribes the distributed data system client and notifies the subscribed distributed data system client of changes to the data key.

Figure 2B:
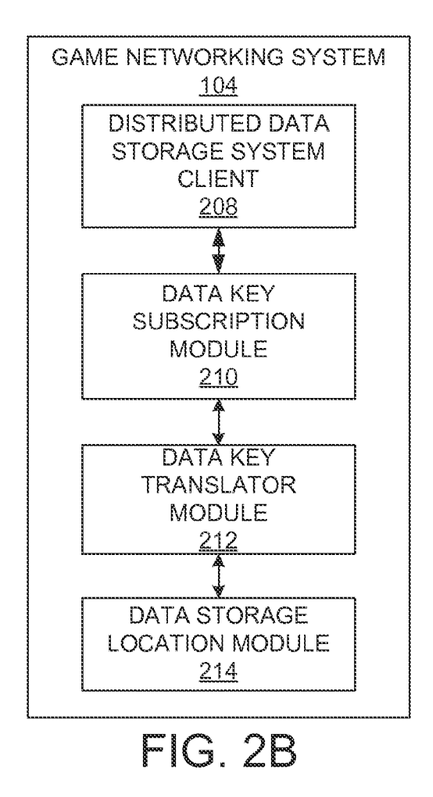
FIG. 2B is a block diagram illustrating an example of a game networking system.

FIG. 2B is a block diagram illustrating an example of a game networking system. The game networking system 104 comprises a distributed data storage system client 208, a data key subscription module 210, a data key translator module 212, and a data storage location module 214.

The distributed data storage client 208 communicates with the distributed data storage server.

The data key subscription module 210 directs the distributed data storage client to subscribe to the data key stored in the storage device of the distributed data storage server, and to receive the changes to the data key.

The data key translator module 212 translates a name of the data key to retrieve a corresponding storage location.

The data storage location module 214 stores the changes to the data key to the corresponding storage location.

Figure 3:
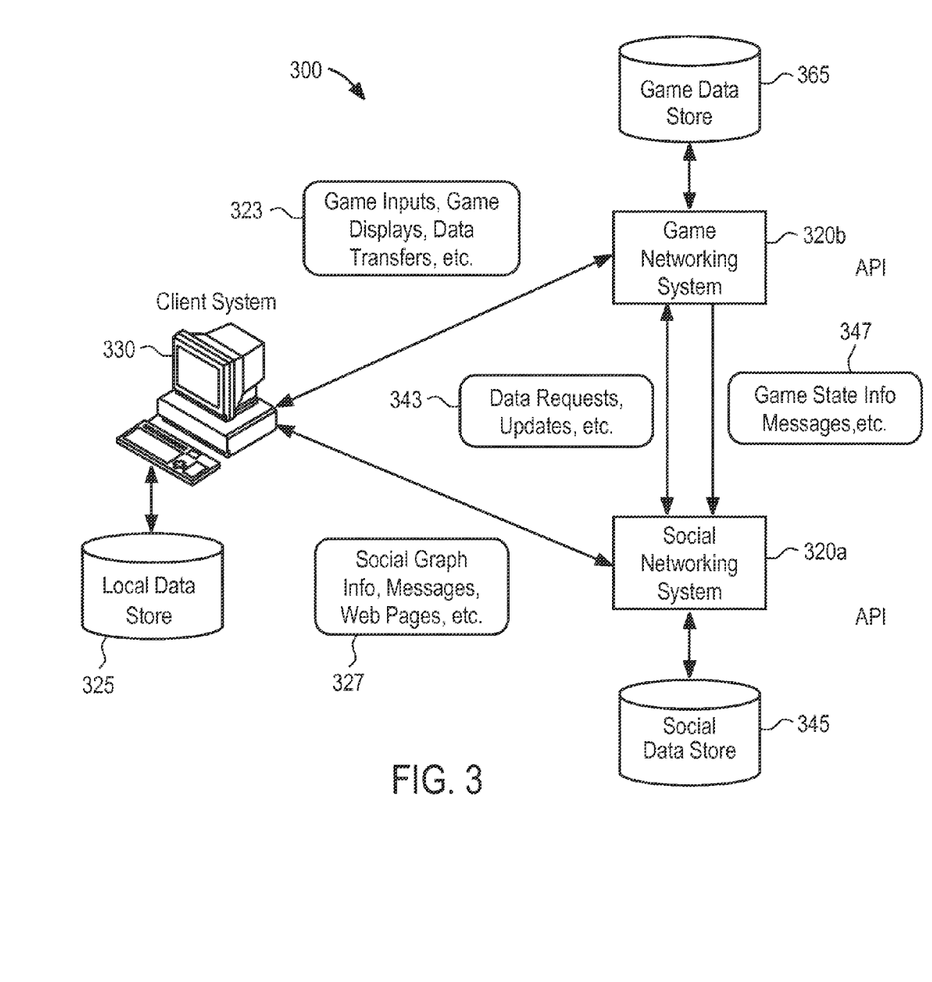
FIG. 3 is a block diagram illustrating an example data flow between the components of the system of FIG. 1.

FIG. 3 illustrates an example data flow between the components of a system 300. In particular embodiments, the system 300 can include a client system 330, a social networking system 320*a*, and a game networking system 320*b*. The components of the system 300 can be connected to each other in any suitable configuration, using any suitable type of connection. The components may be connected directly or over any suitable network. The client system 330, the social networking system 320*a*, and the game networking system 320*b* can each have one or more corresponding data stores such as local data store 325, social data store 345, and game data store 365, respectively. The social networking system 320*a* and the game networking system 320*b* can also have one or more servers that can communicate with the client system 330 over an appropriate network. The social networking system 320*a* and the game networking system 320*b* can have, for example, one or more internet servers for communicating with the client system 330 via the Internet. Similarly, the social networking system 320*a* and the game networking system 320*b* can have one or more mobile servers for communicating with the client system 330 via a mobile network (e.g., GSM, PCS, WPAN, etc.). In some embodiments, one server may be able to communicate with the client system 330 over both the Internet and a mobile network. In other embodiments, separate servers can be used.

The client system 330 can receive and transmit data 323 to and from the game networking system 320*b*. This data can include, for example, webpages, messages, game inputs, game displays, HTTP packets, data requests, transaction information, updates, and other suitable data. At some other time, or at the same time, the game networking system 320*b* can communicate data 347 (e.g., game state information, game system account information, page info, messages, data requests, updates, etc.) with other networking systems, such as the social networking system 320*a* (e.g., Facebook, Myspace, etc.). The client system 330 can also receive and transmit data 327 to and from the social networking system 320*a*. This data can include, for example, webpages, messages, social graph information, social network displays, HTTP packets, data requests, transaction information, updates, and other suitable data.

Communication between the client system 330, the social networking system 320*a*, and the game networking system 320*b* can occur over any appropriate electronic communication medium or network using any suitable communications protocols. For example, the client system 330, as well as various servers of the systems described herein, may include Transport Control Protocol/Internet Protocol (TCP/IP) networking stacks to provide tier datagram and transport functions. Of course, any other suitable network and transport layer protocols can be utilized.

In addition, hosts or end-systems described herein may use a variety of higher layer communications protocols, including client-server (or request-response) protocols (such as HTTP), other communications protocols (such as HTTP-S, FTP, SNMP, TELNET), and a number of other protocols. In addition, a server in one interaction context may be a client in another interaction context. In particular embodiments, the information transmitted between hosts may be formatted as HyperText Markup Language (HTML) documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on the game networking system 320*b*, the BLOB containing the game state for the instance corresponding to the player can be transmitted to the client system 330 fur use by a client-side executed object to process. In particular embodiments, the client-side executable may be a FLASH-based game, which can de-serialize the game state data in the BLOB. As a player plays the game, the game logic implemented at the client system 330 maintains and modifies the various game state parameters locally. The client-side game logic may also batch game events, such as mouse clicks, and transmit these events to the game networking system 320*b*. The game networking system 320*b* may itself operate by retrieving a copy of the BLOB from a database or an intermediate memory cache (memcache) layer. The game networking system 320*b* can also de-serialize the BLOB to resolve the game state parameters and execute its own game logic based on the events in the batch file of events transmitted by the client to synchronize the game state on the server side. The game networking system 320*b* may then re-serialize the game state, now modified, into a BLOB and pass this to a memory cache layer for lazy updates to a persistent database.

With a client-server environment in which the online games may run, one server system, such as the game networking system 320*b*, may support multiple client systems 330. At any given time, there may be multiple players at multiple client systems 330 all playing the same online game. In practice, the number of players playing the same game at the same time may be very large. As the game progresses with each player, multiple players may provide different inputs to the online game at their respective client systems 330, and multiple client systems 330 may transmit multiple player inputs and/or game events to game networking system 320*b* for further processing. In addition, multiple client systems 330 may transmit other types of application data to game networking system 320*b*.

In particular embodiments, a computer-implemented game may be a text-based or turn-based game implemented as a series of web pages that are generated after a player selects one or more actions to perform. The web pages may be displayed in a browser client executed on the client system 330. As an example and not by way of limitation, a client application downloaded to the client system 330 may operate to serve a set of web pages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by the social networking system 320a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at the client system 330, either caused by an action of a game player or by the game logic itself, the client system 330 may need to inform the game networking system 320b of the update. For example, if the game is a farming game with a harvest mechanic (such as Zynga Farm Ville), an event can correspond to a player clicking on a parcel of land to harvest a crop. In such an instance, the application event data may identify an event or action (e.g., harvest) and an object in the game to which the event or action applies. For illustration purposes and not by way of limitation, the system 300 is discussed in reference to updating a multi-player online game hosted on a network-addressable system (such as, for example, the social networking system 320a or the game networking system 320b), where an instance of the online game is executed remotely on the client system 330, which then transmits application event data to the hosting system such that the remote game server synchronizes game state associated with the instance executed by the client system 330.

In a particular embodiment, one or more objects of a game may be represented as an Adobe Flash object. Flash may manipulate vector and raster graphics and support bidirectional streaming of audio and video. "Flash" may mean the authoring environment, the player, or the application files. In particular embodiments, the client system 330 may include a Flash client. The Flash client may be configured to receive and run Flash application or game object code from any suitable networking system (such as, for example, the social networking system 320a or the game networking system 320b). In particular embodiments, the Flash client may be run in a browser client executed on the client system 330. A player can interact with Flash objects using the client system 330 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at the client system 330, the Flash client may send the events that caused the game state changes to the in-game object to the game networking system 320b. However, to expedite the processing and hence the speed of the overall gaming experience, the Flash client may collect a batch of some number of events or updates into a batch file. The number of events or updates may be determined by the Flash client dynamically or determined by game networking system 320b based on server loads or other factors. For example, the client system 330 may send a batch file to the game networking system 320b whenever several updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at the client system 330. In particular embodiments, time batch file may be a text file and the name-value pairs may be in string format.

In particular embodiments, when a player plays an online game on the client system 330, the game networking system 320b may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, the game networking system 320b may retrieve the corresponding BLOB from the database to determine the most recent values of the game-related data. In particular embodiments, while a player is playing the online game, the game networking system 320b may also load the corresponding BLOB into a memory cache so that the game system may have faster access to the BLOB and the game-related data contained therein.

A game event may be an outcome of an engagement, a provision of access, rights and/or benefits, or the obtaining of some assets (e.g., health, money, strength, inventory, land, etc.). A game engine determines the outcome of a game event according to a variety of factors, such as the game rules, a player character's in-game actions, player character state, game state, interactions of other player characters, and random calculations. Engagements can include simple tasks (e.g., plant a crop, clean a stove), complex tasks (e.g., build a farm or business, run a café), or other events.

An online game can be hosted by the game networking system *b*, which can be accessed over any suitable network with an appropriate client system 330. A player may have a game system account on a game system of the game networking system 320b, wherein the game system account can contain a variety of information about the player (e.g., the player's personal information, player character state, game state, etc.). In various embodiments, an online game can be embedded into a third-party website. The game can be hosted by the networking system of the third-party website, or it can be hosted on the game system 321 and merely accessed via the third-party website. The embedded online game can be hosted solely on a server of the game system 321 or using a third-party vendor server. In addition, any combination of the functions of the present disclosure can be hosted on or provided from any number of distributed network resources. For example, one or more executable code objects that implement all or a portion of the game can be downloaded to a client system for execution.

Figure 4:
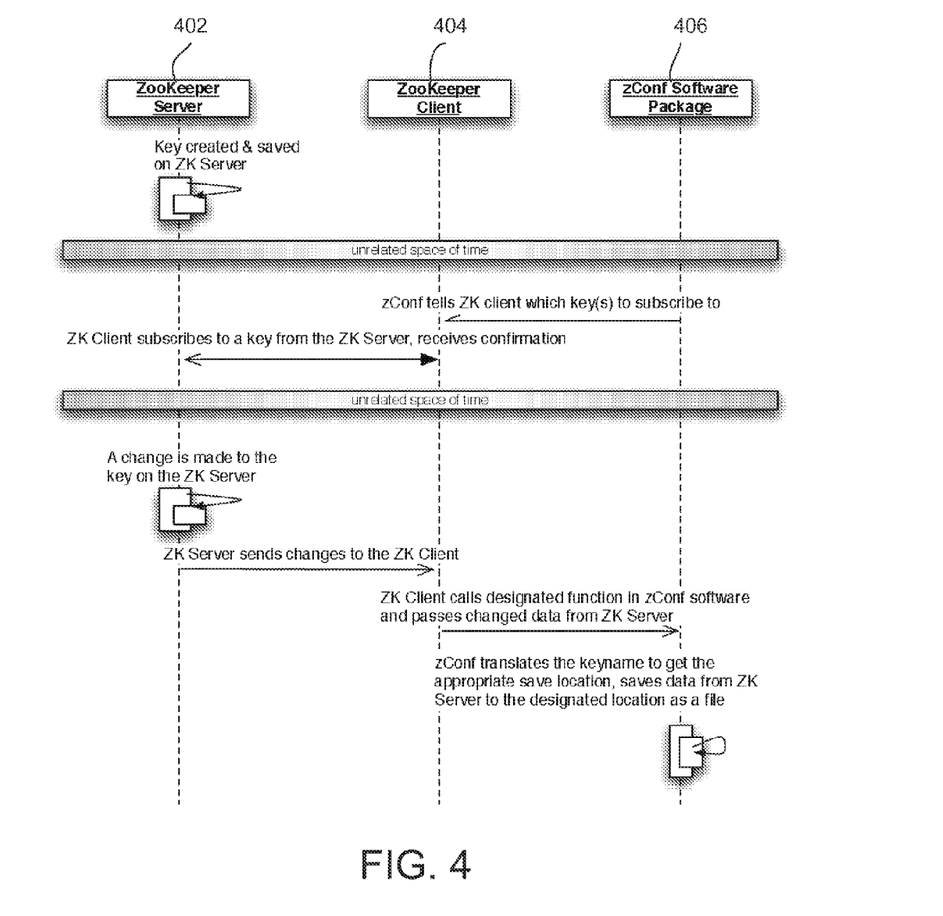
FIG. 4 is a ladder diagram illustrating an example of an operation of the data storage distributed system and the game networking system.

FIG. 4 is a ladder diagram illustrating an example of an operation of the data storage distributed system and the game networking system. ZooKeeper server 402 creates a key and saves it in the server. zConf software package 406 tells the ZooKeeper client 404 which key(s) to subscribe to. In response, ZooKeeper client 404 subscribe to the corresponding key from ZooKeeper server 402 and receives confirmation from ZooKeeper server 402.

When a change is made to the key on ZooKeeper server 402, ZooKeeper server 402 sends changes to ZooKeeper client 404. ZooKeeper client 404 then calls the designated function in zConf software package 406 and passes the changed data from ZooKeeper server 402 to zConf software package 406. zConf software package 406 then translate the keyname to get the appropriate save location, and saves the data from ZooKeeper server 402 to the designated location as a file.

Figure 5:
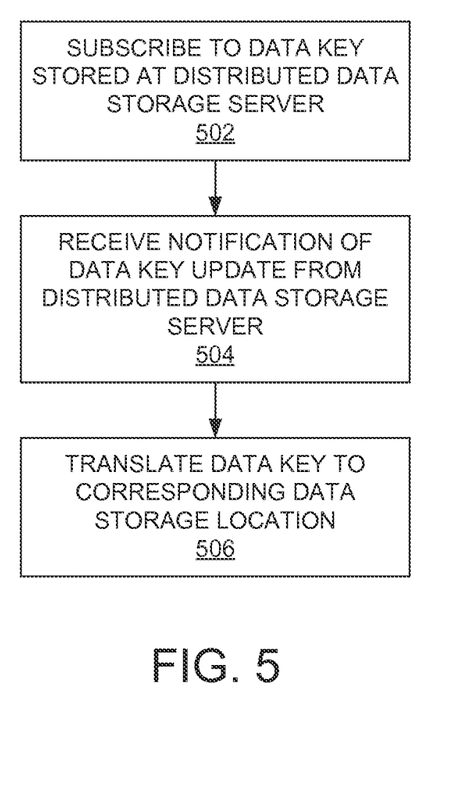
FIG. 5 is a flow diagram illustrating one embodiment of a method for operating a game networking system.

FIG. 5 is a flow diagram illustrating one embodiment of a method for operating a game networking system. At operation 502, a distributed data system client communicates with a distributed data storage server to subscribe to a data key stored in a storage device of the distributed data storage server.

At operation 504, the distributed data system client receives notification of data key updates from the distributed data storage server.

At operation 506, the distributed data system client translates a name of the data key to retrieve a corresponding storage location.

At operation 508, changes to the data key are stored to the corresponding storage location.

Figure 6:
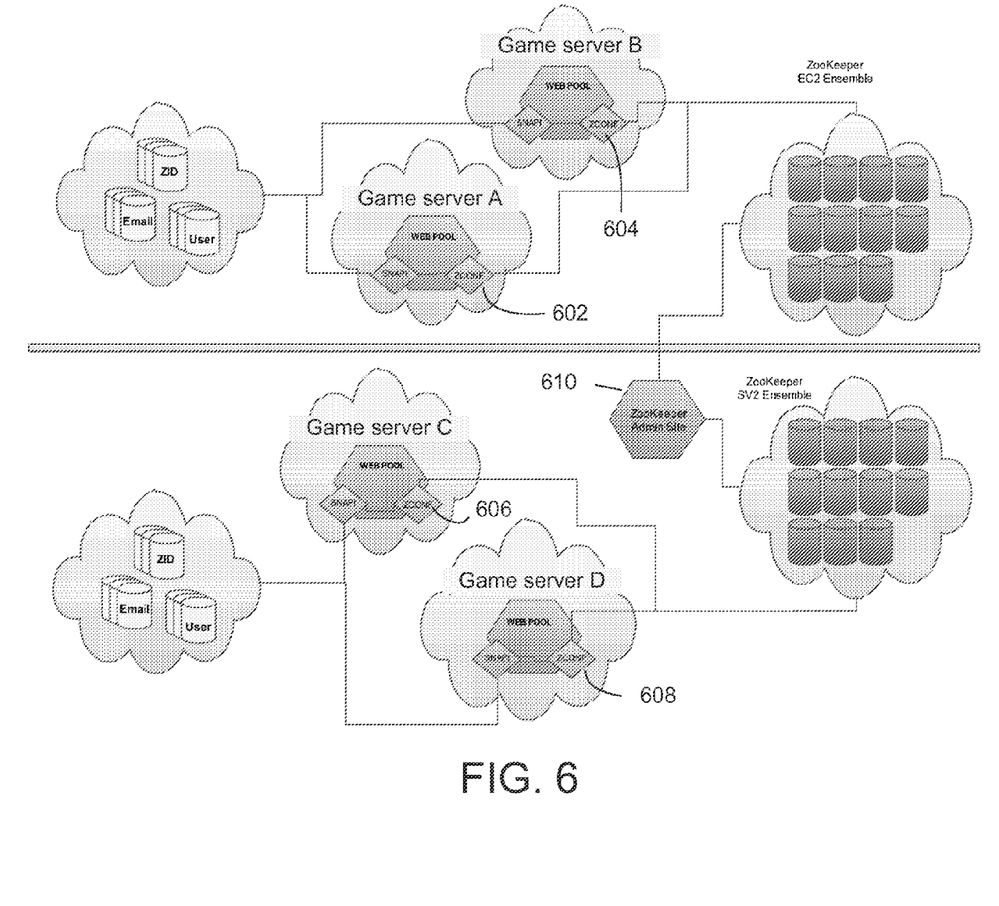
FIG. 6 is a block diagram illustrating an example network environment.

FIG. 6 is a block diagram illustrating an example network environment. Distributed data system clients 602, 604, 606, 608 of each game server A, B, C, and D communicate with a distributed data system storage server 610.

Figure 7:
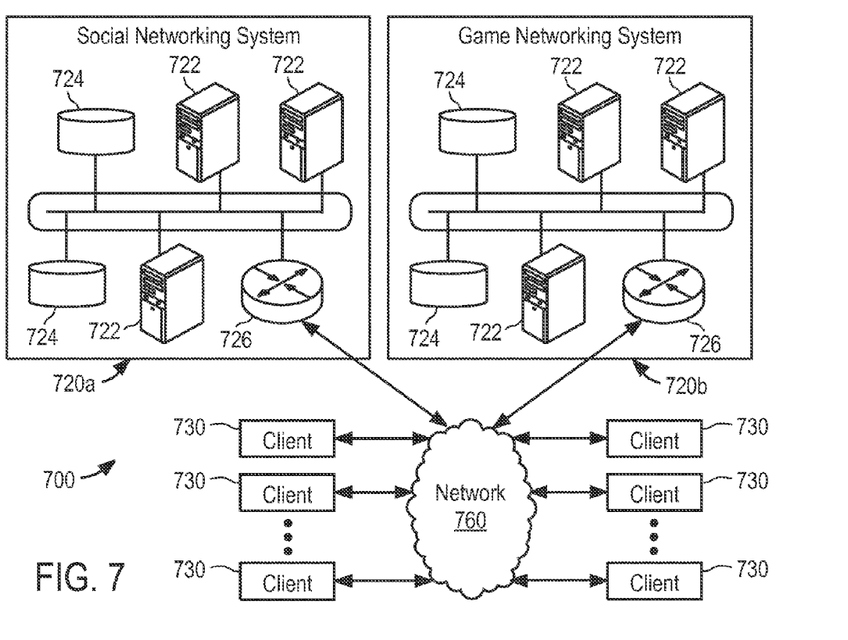
FIG. 7 is a block diagram illustrating another example network environment.

FIG. 7 is a block diagram illustrating an example network environment, in which various example embodiments may operate. In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Network cloud 760 generally represents one or more interconnected networks, over which the systems and hosts described herein can communicate. Network cloud 760 may include packet-based wide area networks (such as the Internet), private networks, wireless networks, satellite networks, cellular networks, paging networks, and the like. As FIG. 7 illustrates, particular embodiments may operate in a network environment comprising one or more networking systems, such as social networking system 720a, game networking system 720b, and one or more client systems 730. The components of social networking system 720a and game networking system 720b operate analogously; as such, hereinafter may be referred to simply at networking system 720. Client systems 730 are operably connected to the network environment via a network service provider, a wireless carrier, or any other suitable means.

Networking system 720 is a network addressable system that, in various example embodiments, comprises one or more physical servers 722 and data stores 724. The one or more physical servers 722 are operably connected to computer network 760 via, by way of example, a set of routers and/or networking switches 726. In an example embodiment, the functionality hosted by the one or more physical servers 122 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 722 may host functionality directed to the operations of networking system 720. Hereinafter servers 722 may be referred to as server 722, although server 722 may include numerous servers hosting, for example, networking system 720, as well as other content distribution servers, data stores, and databases. Data store 724 may store content and data relating to, and enabling, operation of networking system 720 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 724 corresponds to one or more of a variety of separate and integrated databases, such as relational databases and object-oriented databases, that maintain information as an integrated collection of logically related records or files stored on one or more physical systems, Structurally, data store 724 may generally include one or more of a large class of data storage and management systems. In particular embodiments, data store 724 may be implemented by any suitable physical system(s) including components, such as one or more database servers, mass storage media, media library systems, storage area networks, data storage clouds, and the like. In one example embodiment, data store 724 includes one or more servers, databases (e.g., MySQL), and/or data warehouses. Data store 724 may include data associated with different networking system 720 users and/or client systems 730.

Client system 730 is generally a computer or computing device including functionality for communicating (e.g., remotely) over a computer network. Client system 730 may be a desktop computer, laptop computer, personal digital assistant (PDA), in- or out-of-car navigation system, smart phone or other cellular or mobile phone, or mobile gaming device, among other suitable computing devices. Client system 730 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 730 to enter addresses of specific network resources to be retrieved, such as resources hosted by networking system 720. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 730 desires to view a particular webpage (hereinafter also referred to as target structured document) hosted by networking system 720, the user's web browser, or other document rendering engine or suitable client application, formulates and transmits a request to networking system 720. The request generally includes a URL or other document identifier as well as metadata or other information. By way of example, the request may include information identifying the user, such as a user ID, as well as information identifying or characterizing the web browser or operating system running on the user's client computing device 730. The request may also include location information identifying a geographic location of the user's client system or a logical network location of the user's client system. The request may also include a timestamp identifying when the request was transmitted.

Although the example network environment described above and illustrated in FIG. 7 described with respect to social networking system 720a and game networking system 720b, this disclosure encompasses any suitable network environment using any suitable systems. As an example and not by way of limitation, the network environment may include online media systems, online reviewing systems, online search engines, online advertising systems, or any combination of two or more such systems.

Figure 8:
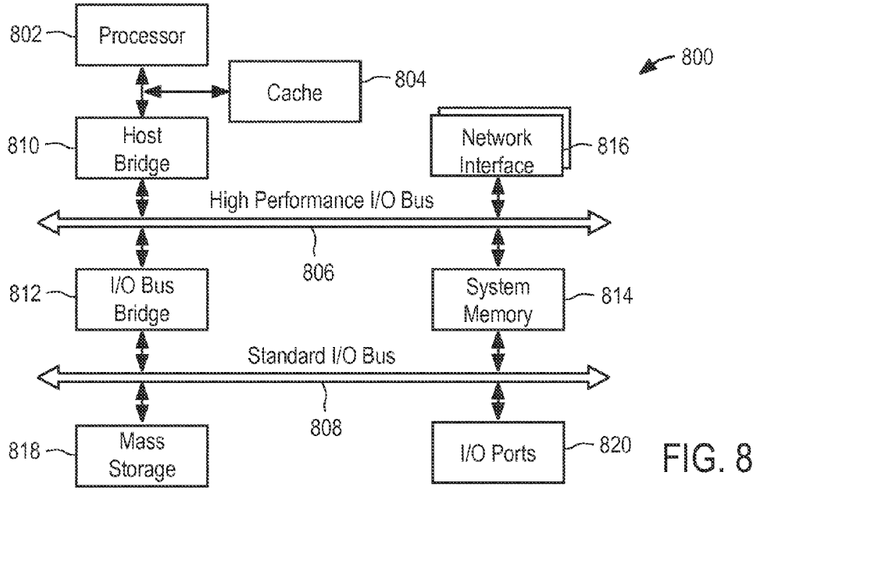
FIG. 8 is a block diagram illustrating an example of a computer system architecture.

FIG. 8 illustrates an example computing system architecture, which may be used to implement a server of a game networking system or a client system of a player computer system. In one embodiment, hardware system 800 comprises a processor 802, a cache memory 804, and one or more executable modules and drivers, stored on a tangible computer readable medium, directed to the functions described herein. Additionally, hardware system 800 may include a high performance input/output (I/O) bus 806 and a standard I/O bus 808. A host bridge 810 may couple processor 802 to high performance I/O bus 806, whereas I/O bus bridge 812 couples the two buses 806 and 808 to each other. A system memory 814 and one or more network/communication interfaces 816 may couple to bus 806. Hardware system 800 may further include video memory (not shown) and a display device coupled to the video memory. Mass storage 818 and I/O ports 820 may couple to bus 808. Hardware system 800 may optionally include a keyboard, a pointing device, and a display device (not shown) coupled to bus 808. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 800 are described in greater detail below. In particular, network interface 816 provides communication between hardware system 800 and any of a wide range of networks, such as an Ethernet (e.g., IEEE 802.3) network, a backplane, etc. Mass storage 818 provides permanent storage for the data and programming instructions to perform the above-described functions implemented in servers 422, whereas system memory 814 (e.g., DRAM) provides temporary storage for the data and programming instructions when executed by processor 802. I/O ports 820 are one or more serial and/or parallel communication ports that provide communication between additional peripheral devices, which may be coupled to hardware system 800.

Hardware system 800 may include a variety of system architectures and various components of hardware system 800 may be rearranged. For example, cache 804 may be on-chip with processor 802. Alternatively, cache 804 and processor 802 may be packed together as a "processor module," with processor 802 being referred to as the "processor core." Furthermore, certain embodiments of the present disclosure may not require nor include all of the above components. For example, the peripheral devices shown coupled to standard I/O bus 808 may couple to high performance I/O bus 806. In addition, in some embodiments, only a single bus may exist, with the components of hardware system 800 being coupled to the single bus. Furthermore, hardware system 800 may include additional components, such as additional processors, storage devices, or memories.

An operating system manages and controls the operation of hardware system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like, Of course, other embodiments are possible. For example, the functions described herein may be implemented in firmware or on an application-specific integrated circuit.

Examples of Nodes and Paths

Figure 9:
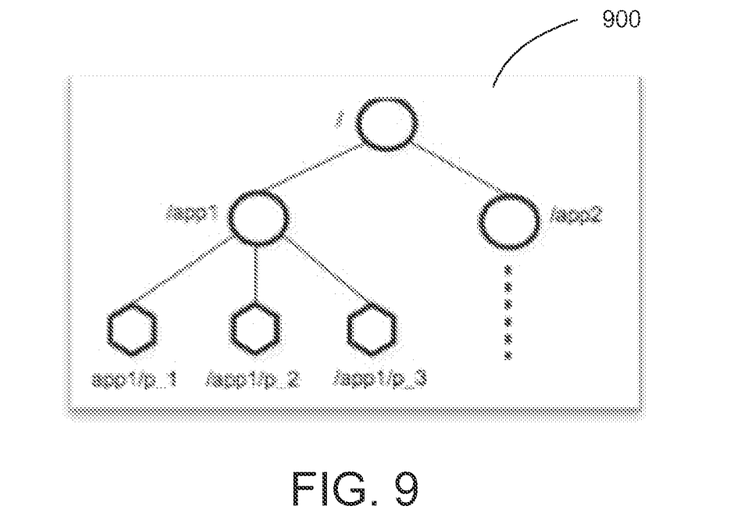
FIG. 9 is a block diagram illustrating an example of nodes.

FIG. 9 shows how ZooKeeper uses a zNode keyname schema 900. For example, the root keyname is "/" a child keyname is "/app1" and a grandchild keyname is "/app1/p_1". The "/" slash is used as a separator between keyname levels.

Figure 10:
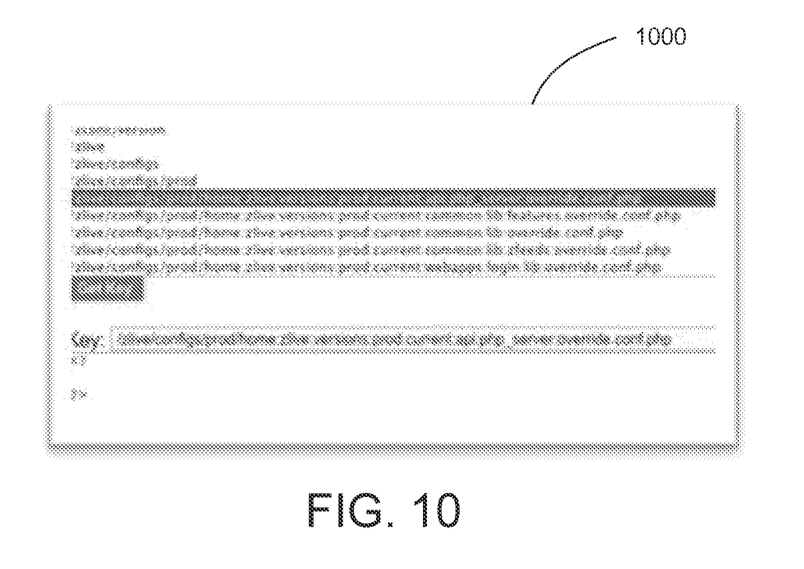
FIG. 10 is a block diagram illustrating examples of paths for nodes in FIG. 9.

FIG. 10 shows example of nodes paths 1000 being named as follows:

"/zlive"
"/zlive/configs"

"/zlive/configs/prod"

"/zlive/configs/prod/home:zlive:versions:prod:current: api:php_serve:override.conf.php"

In each of the examples above, the content after the last forward slash "/" is the zNode name. The data before the last trailing slash is the zNode location.

In the example of "/zlive/configs/prod", "zlive/configs/" is the zNode location, and "prod" is the zNode name.

In the example of "/zlive/configs/prod/home:zlive:versions:prod:current:api:php_server:override.conf.php", "/zlive/configs/prod/" is the zNode location, and "home:zlive:versions:prod:current:api:php_server:override.conf.php" is the zNode name.

In each of above examples, the zNode location and zNode name when put together make up the full zNode Keyname.

zConf has a routine to parse out the zNode keyname to determine both the zNode location and the zNode name. Once it has those data points it checks to see if the zNode name represents a file location. If so—it will then save the contents of the ZooKeeper node into the file location specified in the zNode name.

In the example of "/zlive/configs/prod/home:zlive:versions:prod:current:api:php_server.override.conf.php", the contents of the zNode with KeyName: "/zlive/configs/prod/home:zlive:versions:prod:current:api:php_server:override-.conf.php" is saved into a file at the following destination on the server: "/home/zlive/versions/prod/current/api/php server/override.conf.php"

Miscellaneous

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

One or more features from any embodiment may be combined with one or more features of any other embodiment without departing from the scope of the disclosure.

A recitation of "a," "an," or "the" is intended to mean "one or more" unless specifically indicated to the contrary. In addition, it is to be understood that functional operations, such as "awarding," "locating," "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. Still further, while the embodiments described above operate with business-related virtual objects (such as stores and restaurants), the disclosure can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a distributed data storage server configured to coordinate one or more distributed applications, each distributed application comprising a set of application components to interact with one another during execution of the distributed application, the distributed data storage server comprising:
      a data key generator configured to generate a data key corresponding to a particular application component stored at the distributed data storage server;
      a data key subscription notifier module configured to subscribe a distributed data system client and to provide to the subscribed distributed data system client a change notification indicative of changes associated with the data key; and
   a storage device configured to store the data key, the distributed data system client, comprising:
      a distributed data storage client configured to communicate with the distributed data storage server;
      a data key subscription module configured to direct the distributed data storage client to subscribe to the data key stored in the storage device of the distributed data storage server, and to receive the change notification;
      a data key translator module configured to translate a name of the data key to retrieve a corresponding storage location at the distributed data storage server; and
      a data storage location module configured to store the changes indicated by the change notification to the corresponding storage location.

2. The system of claim 1, wherein the data key corresponds to configuration files of player games status from online games.

3. The system of claim 1, wherein the data key corresponds to a node comprising a key and a value, the key comprising a sequence of path elements.

4. The system of claim 3, wherein the name of the data key comprises a node location and a node name.

5. The system of claim 4, wherein the data key translator module parses the name of the data key to determine the node location, and parses the node name to determine whether the node name corresponds to a file location.

6. The system of claim 5, wherein the data storage location module saves a content of the node corresponding to the data key into the file location specified in the name of the data key.

7. The system of claim 1, wherein the data storage location module stores contents of the node into the corresponding storage location.

8. A computer-implemented method comprising:
   at a distributed data system client, communicating with a distributed data storage server configured to coordinate one or more distributed applications, each distributed application comprising a set of application components configured for interacting with one another when the distributed application executes;
   subscribing to a data key corresponding to a particular application component stored in a storage device of the distributed data storage server;
   receiving a change notification indicative of changes associated with the data key;
   translating a name of the data key to retrieve a corresponding storage location at the distributed data system client; and
   storing the changes indicated by the change notification to the corresponding storage location.

9. The computer-implemented method of claim 8, wherein the data storage server is configured to generate the data key, to subscribe the distributed data system client, to notify the distributed data system client of the changes, indicated by the change notification, and to store the data key.

10. The computer-implemented method of claim 8, wherein the data key corresponds to configuration files of player games status from online games.

11. The computer-implemented method of claim 9, wherein the data key corresponds to a node comprising a key and a value, the key comprising a sequence of path elements.

12. The computer-implemented method of claim 11, wherein the name of the data key comprises a node location and a node name.

13. The computer-implemented method of claim 12, wherein the data key translator module parses the name of the data key to determine the node location, and the node name to determine whether the node name corresponds to a file location.

14. The computer-implemented method of claim 13, wherein the data storage location module saves a content of the node corresponding to the data key into the file location specified in the name of the data key.

15. The computer-implemented method of claim 8, wherein the data storage location module stores contents of the node into the corresponding storage location.

16. The non-transitory computer-readable storage medium of claim 10, wherein the data key corresponds to a node a key and a value, the key comprising a sequence of path elements, and wherein the name of the data key comprises a node location and a node name.

17. The non-transitory computer-readable storage medium of claim 12, wherein the data key translator module parses the name of the data key to determine the node location, and the node name to determine whether the node name corresponds to a file location.

18. The non-transitory computer-readable storage medium of claim 13, wherein the data storage location module saves a content of the node corresponding to the data key into the file location specified in the name of the data key.

19. A non-transitory computer-readable storage medium storing a set of instructions that, when executed by a processor, cause the processor to perform operations that comprises:
 at a distributed data system client, communicating with a distributed data storage server configured to coordinate one or more distributed applications, each distributed application comprising a set of application components configured for interacting with one another when the distributed application executes;
 subscribing to a data key corresponding to a particular application component stored in a storage device of the distributed data storage server;
 receiving a change notification indicative of changes associated with the data key;
 translating a name of the data key to retrieve a corresponding storage location at the distributed data system client; and
 storing the changes indicated by the change notification to the corresponding storage location.

20. The non-transitory computer-readable storage medium of claim 19, wherein the data storage server is configured to generate the data key, to subscribe the distributed data system client, to notify the distributed data system client of the changes, indicated by the change notification, and to store the data key.

\* \* \* \* \*